US012587005B2

(12) United States Patent
Rouquette et al.

(10) Patent No.: US 12,587,005 B2
(45) Date of Patent: Mar. 24, 2026

(54) CONTROLLER FOR AN ELECTRICAL POWER SUPPLY CIRCUIT OF A SUPERCONDUCTING MOTOR, SUPERCONDUCTING ELECTRICAL POWER SUPPLY SYSTEM FOR A MOTOR, AND AIRCRAFT COMPRISING SUCH A SYSTEM

(71) Applicant: Airbus SAS, Blagnac (FR)

(72) Inventors: Jean-François Rouquette, Blagnac (FR); Christian Fallouh, Blagnac (FR)

(73) Assignee: Airbus SAS, Blagnac (FR)

( * ) Notice: Subject to any disclaimer, the term of this patent is extended or adjusted under 35 U.S.C. 154(b) by 260 days.

(21) Appl. No.: 18/431,142

(22) Filed: Feb. 2, 2024

(65) Prior Publication Data

US 2024/0283238 A1      Aug. 22, 2024

(30) Foreign Application Priority Data

Feb. 22, 2023    (FR) .................................. FR2301614

(51) Int. Cl.
*H02M 3/155*          (2006.01)
*H02H 7/00*          (2006.01)
          (Continued)

(52) U.S. Cl.
CPC ............. *H02H 7/001* (2013.01); *H02K 55/02* (2013.01); *H02P 21/22* (2016.02)

(58) Field of Classification Search
CPC ........ H02K 3/47; H02K 41/025; H02K 44/06; H02K 47/18; H02K 5/04; H02K 5/1672; H02K 7/04; H02K 7/063; H02K 7/083; H02K 7/1004; H02K 7/14; H02K 7/1807; H02K 7/1815; H02K 9/06; H02K 9/14; H02K 9/22; H02K 99/00; H02H 7/001;
          (Continued)

(56) References Cited

U.S. PATENT DOCUMENTS

| | | | |
|---|---|---|---|
| 2005/0258795 A1 | 11/2005 | Choi | |
| 2012/0071326 A1* | 3/2012 | Wu | ............................ H01F 6/02 |
| | | | 505/211 |
| 2012/0316070 A1* | 12/2012 | Murphy | ................. H02H 9/042 |
| | | | 361/19 |

FOREIGN PATENT DOCUMENTS

WO          2019146269 A1      8/2019

OTHER PUBLICATIONS

French Search Report for corresponding French Patent Application No. 2301614 dated Sep. 12, 2023.

(Continued)

*Primary Examiner* — Kawing Chan
*Assistant Examiner* — Charles S Laughlin
(74) *Attorney, Agent, or Firm* — Greer Burns & Crain Ltd.

(57)          ABSTRACT

A method, which is executed by a controller, for controlling a power supply circuit of an electric motor, the power supply circuit comprising an inverter supplying the motor with power via a power supply link, the method comprising detecting an increase in the voltage across the terminals of the power supply link while overcoming the inductive component of the impedance of the power supply link, and inhibiting an output for controlling the inverter if the increase in voltage exceeds a predetermined value for a predetermined duration. Also a controller for a power supply circuit that is configured to execute the method, an electrical power supply system for a motor and an aircraft comprising such a system and a control method.

11 Claims, 4 Drawing Sheets

(51) Int. Cl.

| | | |
|---|---|---|
| *H02K 47/18* | (2006.01) |
| *H02K 55/02* | (2006.01) |
| *H02P 21/22* | (2016.01) |

(58) Field of Classification Search
CPC .......... H02H 3/025; H02H 9/023; H02H 7/06; H02H 3/12; H02H 1/0038; H02P 6/34; H02P 9/302
See application file for complete search history.

(56) References Cited

OTHER PUBLICATIONS

S. Nolan et al., "Voltage-Based Current-Compensation Converter Control for Power Electronic Interfaced Distribution Networks in Future Aircraft" IEEE Transactions of Transportation Electrification, IEEE, vol. 6, No. 4, May 29, 2020; pp. 1819-1829.

* cited by examiner

CONTROLLER FOR AN ELECTRICAL POWER SUPPLY CIRCUIT OF A SUPERCONDUCTING MOTOR, SUPERCONDUCTING ELECTRICAL POWER SUPPLY SYSTEM FOR A MOTOR, AND AIRCRAFT COMPRISING SUCH A SYSTEM

CROSS-REFERENCES TO RELATED APPLICATIONS

This application claims the benefit of French Patent Application Number 2301614 filed on Feb. 22, 2023, the entire disclosure of which is incorporated herein by way of reference.

FIELD OF THE INVENTION

The present invention relates to what is known as a superconducting motor, in particular of the type that is able to be used for the propulsion of an aircraft. The invention relates more particularly to the monitoring and control of a superconducting power supply link of an aircraft electric motor that is supplied with power from an inverter, and an aircraft.

BACKGROUND OF THE INVENTION

The aeronautical industry is undergoing profound changes in terms of aircraft design, with the aim of significantly reducing emissions of carbon dioxide and nitrogen oxides due to ecological and sustainable development constraints.

The use of liquid hydrogen as an energy source for an aircraft is a promising way to do this. Hydrogen can be used in a fuel cell, to generate electricity, or directly as fuel in a powertrain. In addition, work is specifically directed to optimize electric or hybrid propulsion systems for aircraft and hydrogen in liquid form on board an aircraft can be used to increase the performance of electrical equipment by lowering the resistivity thereof and consequently reducing losses through Joule effects. It is also possible to use superconducting components. Superconducting conductors can be used for AC distribution in architectures comprising electric motors that are supplied with power by controlled electronic power converters, such as inverters. In such electrical power supply architectures for a motor, the superconducting link between the inverter and the motor must be protected against an unexpected transition from the superconducting state to the conventional state (transition usually called quench in the field of superconducting). It is therefore important to be able to detect warning signs of such a transition in order to avoid excessive losses through the Joule effect that could damage the electrical power supply circuits and their surrounding environment.

The detection of the quench of a superconducting conductor is generally performed by monitoring the voltage across the terminals of said conductor and by detecting the occurrence of an increase in the voltage level across its terminals. The detection of a quench on a direct current-carrying link (referred to as DC link) is fairly easy since it is a question of distinguishing a zero or non-zero impedance (i.e., resistance) of the conductor, but the same does not apply for an alternative current-carrying link (referred to as AC link). In fact, in the latter case, the inductive component of the impedance is never zero and is even greater than the resistive component in most cases, which disturbs or even prevents detection of the quench with conventional means.

There is therefore a need to obtain a reliable solution which makes it possible to overcome the inductive effect on the voltage across the terminals of the conductor or conductors of the electrical power supply link of the motor.

The document "Voltage-Based Current-Compensation Converter Control for Power Electronic Interfaced Distribution Networks in Future Aircraft" by Steven Nolan, Catherine E. Jones, Rafael Peña-Alzola, Patrick J. Norman, Graeme Burt, Paul Miller and Mark Husband discloses a method for controlling and managing power in an electrical distribution network according to the prior art.

The situation can be improved.

SUMMARY OF THE INVENTION

An object of the present invention is to propose a controller for a power supply circuit of an electric motor supplied with AC current that is capable of quickly and reliably detecting the occurrence of a quench-type phenomenon in an electrical power supply link to a motor, so as to limit the current or currents supplied to the motor by an inverter when the power supply link between the inverter and the motor is about to pass from a nominal superconducting state to a state in which its resistivity increases.

To this end, a method is proposed for controlling a power supply circuit of an electric motor, the power supply circuit comprising a power converter, referred to as an inverter, which is configured to supply at least one AC voltage from a DC voltage source and a superconducting power supply link, which is configured to supply the electric motor with power, the superconducting power supply link being connected between an output of the inverter and the electric motor, the method being executed in a power supply circuit controller comprising a control output configured to control the inverter, at least one first input configured to receive at least one first signal representative of a voltage measured across the terminals of the superconducting power supply link, and a second input, referred to as a synchronization input, configured to receive at least one second signal representative of the position of the rotor of the electric motor, the method comprising:

i) multiplying the first signal and a sinusoidal signal synchronized with the second signal to obtain a third signal that is representative of the resistive component of the voltage measured across the terminals of the superconducting power supply link, and then, ii) if the third signal exceeds a predetermined threshold value, inhibiting the control output, and if not, repeating steps i) and ii).

Advantageously, it is therefore possible to detect, reliably and quickly, and with limited means, the occurrence of a quench phenomenon in a superconducting power supply link of an electric motor supplied with AC current.

According to one embodiment, in the method for controlling a power supply circuit, obtaining said third signal comprises low-pass filtering a result of the multiplication of said first signal with said second signal.

Another object of the invention is a controller device for a power supply circuit of an electric motor, the power supply circuit comprising a power converter, referred to as an inverter, which is configured to supply at least one AC voltage from a DC voltage source and a superconducting power supply link, which is configured to supply the electric motor with power, the superconducting power supply link being connected between an output of the inverter and the electric motor, the controller device for a power supply circuit comprising a control output configured to control the inverter, at least one first input configured to receive at least one first signal representative of a voltage measured across the terminals of the superconducting power supply link, and a second input, referred to as a synchronization input, configured to receive at least one second signal representative of the position of a rotor of the electric motor, the controller device for a power supply circuit comprising electronic circuitry that is configured to:

i) multiply the first signal and a sinusoidal signal synchronized with the second signal to obtain a third signal that is representative of the resistive component of the voltage measured across the terminals of the superconducting power supply link, and then, ii) if said third signal exceeds a threshold value, inhibit said control output, and if not, repeat steps i) and ii).

The controller device according to the invention can also comprise the following features, considered alone or in combination:

The controller device for a power supply circuit further comprises a circuit for low-pass filtering a result of the multiplication of said first signal with said second signal to obtain said third signal.

Said electronic circuitry of the controller device for a power supply circuit comprises a microprocessor-based control unit that is configured to perform operations and processing operations on the basis of signals applied to said first and second inputs of said controller.

The power supply circuit controller comprises:

a signal multiplier circuit comprising a multiplier output and two multiplier inputs, one of which, the first of said two multiplier inputs, is connected to said first input and the other of which, the second of said two multiplier inputs, is connected to an output of a controlled sinusoidal signal generator, a low-pass filter circuit with a controlled cut-off frequency, comprising a filtered signal output and an input for a signal to be filtered, which input for a signal to be filtered is connected to the multiplier output of the signal multiplier, and a cut-off frequency control input, which cut-off frequency control input is connected to an output of a frequency determination module, a command circuit comprising an input connected to the filtered signal output of the lowpass filter circuit, and a command output that is configured to validate or inhibit the transmission of a command signal that is able to be transmitted to said control output of the power supply circuit controller.

Said frequency determination module of the power supply circuit controller is configured to determine a frequency of rotation of the electric motor from an electrical signal, comprising pulses, that is applied to the second input and the controlled sinusoidal signal generator is configured to generate a sinusoidal signal of determined frequency that is synchronized with a reference position of the rotor of the electric motor.

The controlled cut-off frequency of the low-pass filter of the power supply circuit controller is determined by way of the determined frequency of rotation.

Another object of the invention is a system for supplying electrical power to an electric motor comprising a controller for a superconducting power supply link as described above.

The invention also relates to an aircraft comprising at least one controller for a superconducting power supply link as described above or a system as mentioned above.

Finally, the invention relates to a computer program product comprising program code instructions for executing the steps of the method described when the program is executed by a processor of a power supply circuit controller, and a storage medium device comprising such a program.

BRIEF DESCRIPTION OF THE DRAWINGS

The above-mentioned features of the invention, as well as others, will become more clearly apparent from reading the following description of an exemplary embodiment, said description being given in relation to the appended drawings.

DETAILED DESCRIPTION OF THE PREFERRED EMBODIMENTS

Figure 1:
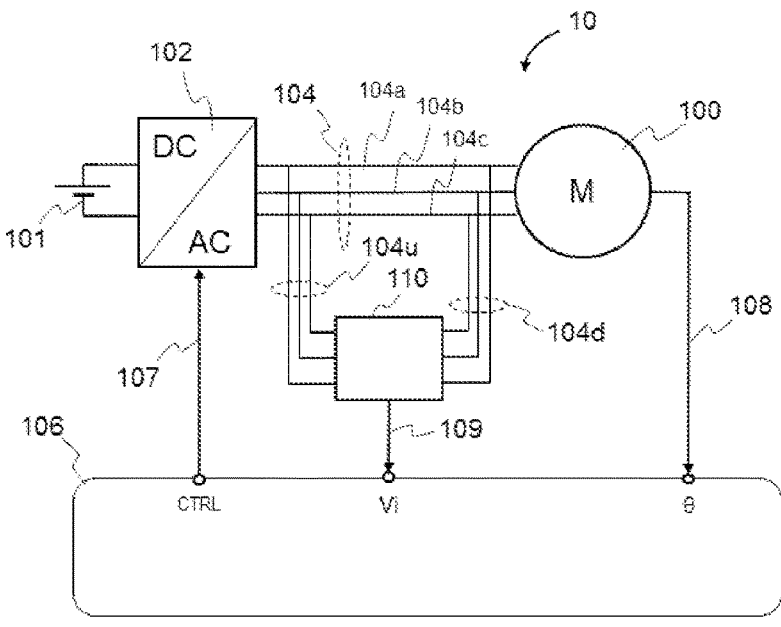
FIG. 1 schematically illustrates a controller for an electrical power supply circuit of an electric motor operating in an electrical power supply system of an aircraft engine, according to one embodiment.

FIG. 1 is a schematic representation of an electrical power supply system 10 configured to supply electrical power to an electric motor 100, according to one embodiment. According to the example described here, the electric motor 100 is an aircraft engine. To this end, the electrical power supply system 10 comprises a power supply circuit controller 106 for controlling a power supply circuit comprising an inverter 102, itself supplying a superconducting electrical power supply link 104, which is connected to the electric motor 100, with power. The superconducting electrical power supply link 104 is connected between an output of the inverter 102 and the electric motor 100. The inverter 102 performs power converter functions and provides the electric motor 100 with a three-phase electrical network of voltages, via the superconducting power supply link 104, from a DC voltage source 101. The three-phase electrical network comprises a first electrical power supply line 104a, a second electrical power supply line 104b and a third electrical power supply line 104c. These three electrical power supply lines together make up the superconducting power supply link 104.

In order to control the power supply circuit of the electric motor 100, the power supply circuit controller 106 comprises at least:

a current control output CTRL configured to current-control the inverter 102, a first input, Vi, configured to receive a signal that is representative of a voltage measured across the terminals of the superconducting power supply link 104, and, a second input, θ, referred to as synchronization input pin, configured to receive at least one item of information that is representative of the position of the rotor of the electric motor 100 from the electric motor 100 via a connection link 108.

The control of the inverter 102 by the power supply circuit controller 106 uses a connection link 107. According to one embodiment, the connection link 107 carries a pulse-width modulation (PWM)-type signal generated by control circuits and modules performing vector control-type inverter control.

According to one embodiment, the three power supply lines 104a, 104b and 104c of the superconducting power supply link 104 are arranged in the same cryogenic volume and only one of them is subjected to a voltage measurement between the ends thereof by a potential difference determination module 110, one output of which is connected to the input Vi of the power supply circuit controller 106 via a connection link 109. According to this configuration, and in the case of a loss of cryogenic fluid causing an increase in the temperature in the superconducting power supply link 104, the sole detection of an increase in the potential difference on the power supply line connected to the potential difference determination module 110 is sufficient to perform a quench detection and to define subsequent operations useful for the preservation of the systems.

According to one variant embodiment, the potential difference determination module 110 comprises internal multiplexing circuits for sequentially scanning (monitoring) the potential differences between the two ends of each of the electrical power supply lines 104a, 104b and 104c, successively and iteratively.

According to one variant embodiment, each of the electrical power supply lines 104a, 104b and 104c is associated with a potential difference determination module such as the module 110 and the control and supervision circuits described below are reproduced for each of the power supply lines 104a, 104b and 104c so as to detect a quench phenomenon as soon as possible on one or the other of the power supply lines 104a, 104b and 104c of the electrical power supply link 104. An "OR"-type logic is then used at the output of these three identical or similar circuits to inhibit or modify the control of the inverter in the presence of a quench phenomenon on any of the three power supply lines 104a, 104b and 104c of the superconducting electrical power supply link 104. The connection links between one of the respective ends of the electrical power supply lines 104a, 104b and 104c and the potential difference determination module 110 form a bus 104u. The connection links between the other of the respective ends of the electrical power supply lines 104a, 104b and 104c and the potential difference determination module 110 form a bus 104d.

Cleverly and advantageously, the power supply circuit controller 106 performs processing operations and operations on the basis of potential difference information measured across the terminals of at least one of the electrical power supply lines 104a, 104b and 104c via the potential difference determination module 110 and the input Vi thereof, on the one hand, and on the basis of the position of the rotor of the electric motor 100, obtained via the input θ thereof, to distinguish the resistive component of the voltage measured across the terminals of at least one of the power supply lines of the power supply link 104, on the other hand.

To this end, the power supply circuit controller 106 comprises electronic circuitry configured to:

i) multiply the signal available at the input Vi with a sinusoidal signal synchronized with said signal available at the input θ to obtain a signal that results from the multiplication and that is representative of the resistive component of the voltage measured across the terminals of the superconducting power supply link 104, and, electronic circuitry configured to:

ii) if the signal that results from the multiplication exceeds a predetermined threshold value, inhibit the output CTRL for controlling the inverter 102 and if not, repeat steps i) and ii) in a loop.

According to one embodiment, the electronic circuitry is configured to inhibit the output CTRL for controlling the inverter 102 only if the signal that results from the multiplication performed exceeds the predetermined threshold value for at least a predetermined threshold duration or for a duration exceeding this threshold duration.

The term "inhibit the output for controlling the inverter" here refers to any operation subsequent to the detection of the threshold value being crossed (if applicable for a period equal to or exceeding a threshold period) and aimed at limiting the heat dissipation through the Joule effect in the superconducting power supply link 104 by limiting the current supplied by the inverter 102 to each of the electrical power supply lines 104a, 104b and 104c or by interrupting the operation of the inverter 102.

According to one exemplary embodiment, the inhibition of the output CTRL defines a degraded mode of operation of the inverter 102 at reduced power. According to another exemplary embodiment, the inhibition of the output CTRL isolates the DC voltage source 101 from the inverter 102. These exemplary embodiments are not limiting and other modes of controlling the power dissipated in the electrical power supply link 104 via the control output CTRL of the inverter 102 can of course be implemented.

Figure 2:
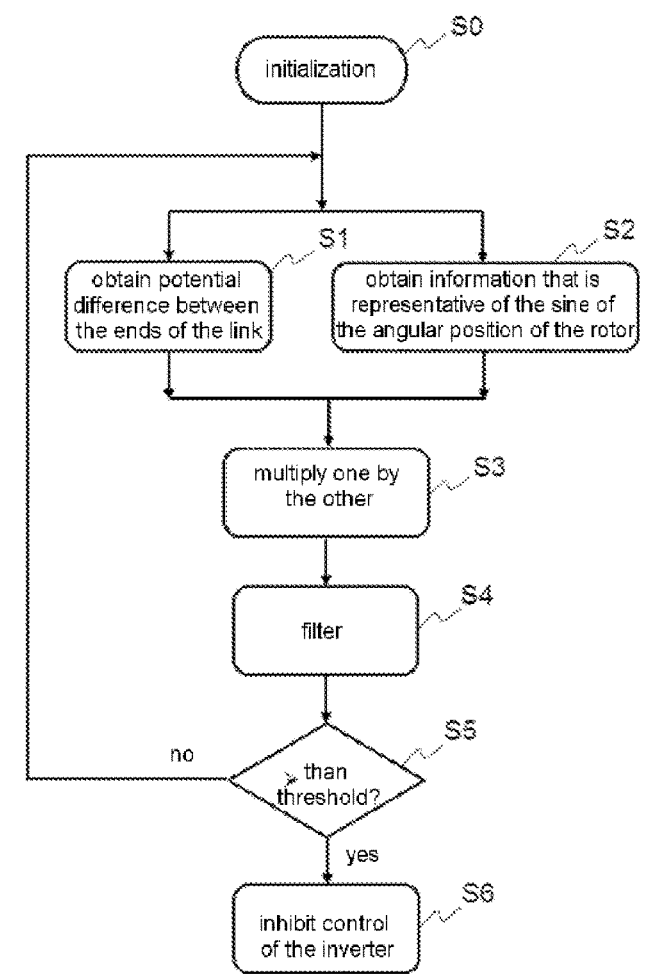
FIG. 2 is a flowchart illustrating a method for controlling an electrical power supply circuit of an electric motor, executed in a controller for an electrical power supply system of an aircraft engine, according to one embodiment.

FIG. 2 is a flowchart-type diagram that illustrates steps of a method for controlling the power supply link 104 of the electrical power supply system 10 of the electric motor 100, executed by the power supply circuit controller 106, according to one embodiment. A step S0 comprises operations for initializing and configuring the set of systems present aimed at obtaining a nominal state defined as a normally operational configuration for use of the electric motor 100 and its electrical power supply circuit 10.

A step S1 comprises obtaining, by way of the power supply circuit controller 106, via the input Vi thereof, a potential difference measured between the ends of at least one electrical power supply line among the electrical power supply lines 104a, 104b and 104c of the superconducting electrical power supply link 104. A step S2 comprises obtaining, by way of the power supply circuit controller 106, a position of the rotor of the motor 100, via its input θ, as well as synchronizing a sinusoidal signal constructed internally to the power supply circuit controller 106 with a predetermined position θ1 of the rotor, so as to isolate the purely resistive component of the voltage measured across the terminals of one or more electrical power supply lines of the electrical power supply link 104 (synchronized with the fundamental component of the current injected into the electric motor 100) and to eliminate any disturbance related to the inductive component of this voltage. More precisely, step S2 makes it possible to obtain information about the sine of the angular position of the rotor of the motor 100. Steps S1 and S2 are performed in parallel with one another, i.e., simultaneously. Cleverly, the two quantities thus obtained, namely a first item of information that is representative of a potential difference measured between the ends of the power supply link 104 and a second item of information that is representative of the sine of the angular position of the rotor of the motor 100, are multiplied in a step S3 so as to perform improved detection of a quench phenomenon suited to a three-phase AC current power supply for the electric motor 100.

An optional step S4 of low-pass filtering can be carried out to filter the result of the multiplication performed, then the result of the multiplication, or where appropriate this result filtered by a low-pass filter, is compared with a predetermined threshold value, in a step S5. The result of step S4 makes it possible to obtain the resistive component of the power supply link 104. Such a low-pass filtering operation is, however, optional. In the case where the value compared with the threshold value exceeds the predetermined threshold value, and therefore in the presence of a quench phenomenon, the output CTRL for controlling the inverter 102 is inhibited in a step S6 so as to preserve the integrity of the power supply systems of the electric motor 100 present. In the opposite case, and therefore in the absence of a quench phenomenon detected in the superconducting electrical power supply link 104, the power supply circuit controller 106 loops back to steps S1 and S2 to perform a new iteration of the method steps described above. Optionally, in step S5, and after detection of the exceedance of the predetermined threshold value, it is verified that the exceedance of the predetermined threshold value is detected for at least a predetermined duration to authorize the inhibition operations of step S6, otherwise, if the exceedance of the predetermined threshold value occurs only for a time less than the predetermined threshold duration and is then overcome, the method continues in sequence by looping back starting from steps S1 and S2. According to one embodiment, such timely detection leads to a configuration of systems for supervising and controlling the electrical power supply circuit 10 of the motor 100.

According to one embodiment, the predetermined threshold value with which the result of the multiplication carried out in step S3 is compared is predetermined by calculation or during operational tests in a research laboratory, or even during validation and/or approval tests. The same applies to the value of the threshold duration of exceedance, if applicable. According to one embodiment, these two values are programmable, preferably remotely via a remote control interface of the power supply circuit controller 106.

The steps of the method described above can be implemented indifferently by hardware circuitry, by software functions or by a combination of these two forms of implementation.

Figure 3:
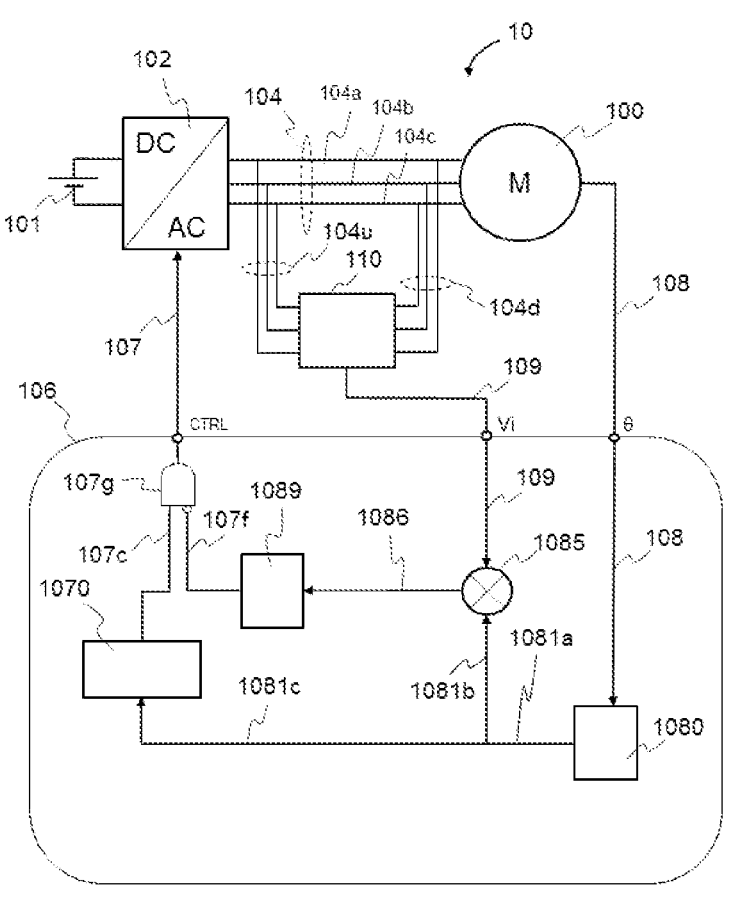
FIG. 3 schematically illustrates a controller for an electrical power supply circuit of an electric motor in an electrical power supply system of an aircraft engine, according to one embodiment, in particular comprising the use of software functions.

FIG. 3 shows main modules of the power supply circuit controller 106 that are implemented in hardware or software form or a combination of these two forms. The input Vi of the power supply circuit controller 106 is configured to receive information that is representative of the potential difference present between opposite ends of the power supply lines 104a, 104b and 104c via the connection link 109. The three-phase electrical potential measurement the bus 104u and the bus 104d respectively connect the upstream and downstream ends of the superconducting electrical power supply link 104 to the potential difference determination module 110. The potential difference determination module 110 comprises synchronized multiplexing means for connecting the various power supply lines of the bus 104u and of the bus 104d to its internal circuits for determining a potential difference. The potential difference determination module 110 is further configured to supply, via the connection link 109, information in the form of a signal, which information is representative of the potential differences present between the ends (or terminals) of each of the power supply lines 104a, 104b or 104c of the superconducting electrical power supply link 104. The potential difference determination module 110 may comprise digital or analogue electronic circuitry or a combination of these two types of electronic circuitry to perform these functions of determining the voltages across the terminals of the superconducting electrical link 104, or more precisely a quantity that is representative of the impedance of one or more power supply lines of the superconducting electrical power supply link 104.

According to one embodiment, the synchronization input θ is connected to a position synchronization output of the electric motor 100 via a connection link 108, and carries a signal that is representative both of the frequency of rotation of the motor and of the position of the rotor with respect to a predefined reference position of the rotor. According to one embodiment, the connection link 108 comprises several independent signals enabling this information to be encoded.

The control output CTRL of the power supply circuit controller 106 supplies, via the connection link 107, signals modulated by pulse-width modulation to an input for controlling the switching of the inverter 102. According to the example described, the output of the inverter 102 is current-controlled from the control output CTRL of the controller 106.

According to one embodiment, the power supply circuit controller 106 comprises three outputs CTRL1, CTRL2 and CTRL3, each dedicated to one of the power supply (phase) lines of the three-phase superconducting electrical power supply link 104, and a complete quench phenomenon detection system is implemented for each of the power supply lines 104a, 104b and 104c of the superconducting power supply link 104, in the power supply circuit controller 106.

In the present description, a connection link and the signal carried by this connection link are referred to interchangeably. Thus, for example, the synchronization signal that is representative of the position of the rotor of the electric motor 100, carried by the connection link 108, is also called the signal 108. In the same way, the signal that is representative of an electrical potential difference supplied by the module 110 and carried by the connection link 109 is also called the signal 109, and the current control signal carried by the connection link 107 is also called the signal 107.

The principle of detection of a quench phenomenon is described here in relation to the superconducting power supply link 104a. According to one embodiment, the same principle is applied for the superconducting power supply links 104b and 104c, using means similar to those implemented with regard to the superconducting power supply link 104a. With regard to the internal electronic circuitry of the power supply circuit controller 106, consisting of the inverter 102 and the power supply link 104, the synchronization signal 108 supplied by the synchronization output of the electric motor 100 is applied to a module 1080 for determining the frequency of rotation of the motor and for generating sinusoidal signals, also called frequency determination and sinusoidal signal generation module 1080. The module 1080 is configured in particular to generate controlled sinusoidal signals that are synchronized with a position of the rotor of the electric motor 100. Signals synchronized with an angular reference position of the rotor are supplied via a connection link 1081a. Cleverly, a synchronized sinusoidal signal 1081a is applied via a connection link 1081*b* to an input of a multiplier circuit 1085, the other input of which is connected to the signal 109 that is representative of the potential difference present between the ends of the power supply line 104*a* or of another of the power supply lines, if applicable. The multiplication of this sinusoidal signal synchronized with the resistive component and of a quantity proportional to a potential difference measured between the ends of the superconducting power supply line 104*a* advantageously makes it possible to have, on an output 1086 of the multiplier 1085, information that is representative of the absence or presence of a quench phenomenon in the superconducting link 104. This information, which is in the form of a signal containing a DC component of interest and a component having a frequency equal to twice the frequency of the quantities present in the link 104, is then optionally filtered by a low-pass filter circuit (not shown in FIG. 3) with a controlled cut-off frequency to obtain information, of even better quality, that is representative of the absence or presence of a quench phenomenon in the superconducting link 104. The signal 1086, which is possibly filtered by a low-pass filter circuit, is then applied to a command circuit 1089 configured to inhibit the output CTRL for controlling the current of the inverter 102 in the event of a problem such as, for example, a quench phenomenon. The command circuit 1089 is configured to detect a quench phenomenon, as described above, and can also be configured to detect a temperature problem or else a current problem, for example. More broadly, the command circuit 1089 is configured to perform supervision and protection functions for the superconducting electrical power supply circuit 10. In fact, according to one embodiment, a signal available on an output 107*f* of the command circuit 1089 is applied to a command output (or controlled output) configured to validate or inhibit the transmission of a command signal 107*c* that is able to be transmitted to the output pin CTRL of the power supply circuit controller 106 via an output control circuit 107*g*. Thus, the command signal 107*c* that is able to be transmitted to the output pin CTRL is determined by way of example by vector control-type control mainly implemented by a command module 1070. According to the exemplary embodiment described here, the signal 107 is therefore identical to the signal 107*c* when the output control circuit is not activated by the command circuit 1089 to inhibit the current control of the inverter 102. The command module 1070 is configured to control the motor torque and to determine a command signal CTRL in particular on the basis of a signal 1081*c* that corresponds to a torque setpoint. This signal is also dependent on the angular position θ of the electric motor 100. The details of the implementation of the vector control performed by the power supply circuit controller 106, independent of the circuits specific to the quench detection described above, are not described here in greater detail in so far as they are known to a person skilled in the art of inverter control and in so far as they are not useful for a good understanding of the invention.

The clever use of a multiplier circuit such as the multiplier circuit 1085 to obtain information that is representative of a quench phenomenon on the basis of the potential difference measured between the ends of the superconducting electrical power supply link 104, on the one hand, and the angular position θ of the rotor of the electric motor 100, on the other hand, therefore makes it possible to advantageously perform a rapid and reliable detection of the occurrence of a quench phenomenon, which can be all the more reliable as the signal obtained at the output of the multiplier circuit 1085 can be filtered by a low-pass filter circuit whose cut-off frequency depends on the frequency of rotation of the electric motor 100. Advantageously, the cut-off frequency of the low-pass filter used is determined as a function of the frequency of rotation of the electric motor 100.

The use of a power supply circuit controller with the internal architecture of the power supply circuit controller 106, or an equivalent architecture performing the same functions, advantageously makes it possible to control the supply of electrical energy to the motor 100 to avoid degradation or even destruction of the superconducting link 104 when the conditions for correct operation are no longer met.

Figure 5:
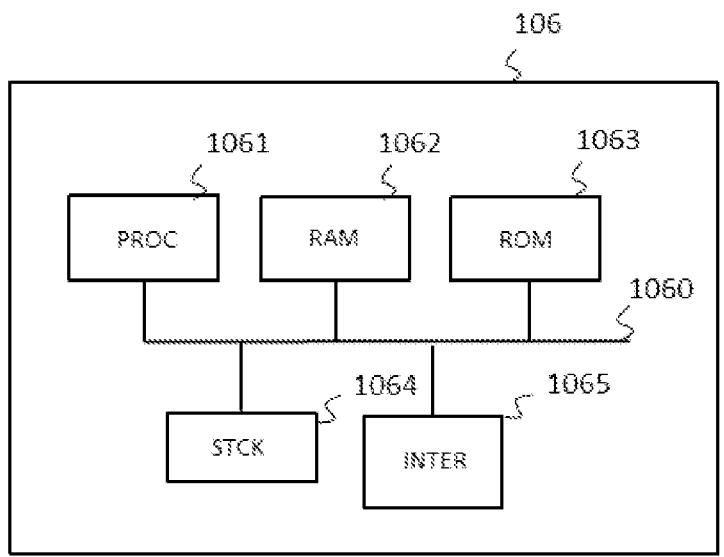
FIG. 5 schematically illustrates an example of the internal architecture of the power supply circuit controller already represented in FIG. 1 and FIG. 3; and, FIG. 6 illustrates an aircraft comprising an electrical power supply system comprising an electrical power supply circuit controller according to one embodiment.

FIG. 5 is a diagram illustrating an example of an internal architecture of the power supply circuit controller 106, according to one embodiment. It will be considered by way of illustration that FIG. 5 illustrates an internal layout of the power supply circuit controller 106. It will be noted that FIG. 5 could also schematically illustrate an example of a hardware architecture of a processing module included in the power supply circuit controller 106, in addition to other modules configured to perform other functions.

According to the example of a hardware architecture shown in FIG. 5, the power supply circuit controller 106 then comprises the following, connected by a communication bus 1060: a processor or CPU ("central processing unit") 1061; a random access memory RAM 1062; a read-only memory ROM 1063; a storage unit such as a hard drive (or a storage medium reader, such as an SD ("Secure Digital") card reader) 1064; at least one interface module 1065 enabling the power supply system controller 106 to communicate with devices present in the power supply system 10, such as, for example, the inverter 102, the potential difference determination module 110 and the electric motor 100. Advantageously, the interface module INTER 1065 in particular comprises input/output ports, inputs for digital/analogue converters and for analogue/digital converters, pulse-width-modulation-controlled outputs, and more generally all types of interfaces useful for the management of a system for supplying a motor with a three-phase current source of the type of an inverter operating on the basis of a DC energy source. In particular, the interface module INTER 1065 of the controller 106 is configured to perform in particular vector control functions of an inverter such as the inverter 102.

The processor 1061 is capable of executing instructions loaded into the RAM 1062 from the ROM 1063, from an external memory (not shown), from a storage medium (such as an SD card), or from a communication network. When the power supply circuit controller 106 is powered up, the processor 1061 is capable of reading program code instructions from the RAM 1062 and of executing them. These instructions form a computer program that causes the processor 1061 to implement all or part of a method described with reference to FIG. 2, or all or some of the variants described in this method.

All of part of the method described with reference to FIG. 2 or its described variants may be implemented in software form through the execution of a set of instructions by a programmable machine, for example a digital signal processor (DSP) or a microcontroller, or may be implemented in hardware form by a machine or a dedicated component, for example a field-programmable gate array (FPGA) or an application-specific integrated circuit (ASIC). In general, the power supply circuit controller 106 comprises electronic circuitry configured to implement the methods described in relation to the power supply circuit controller 106. Of course, the power supply circuit controller 106 also comprises all of the elements usually present in a system comprising a control unit and its peripherals, such as a power supply circuit, a power supply supervision circuit, one or more clock circuits, a reset circuit, related input/output ports, interrupt inputs, bus drivers, this list being non-exhaustive.

Figure 4:
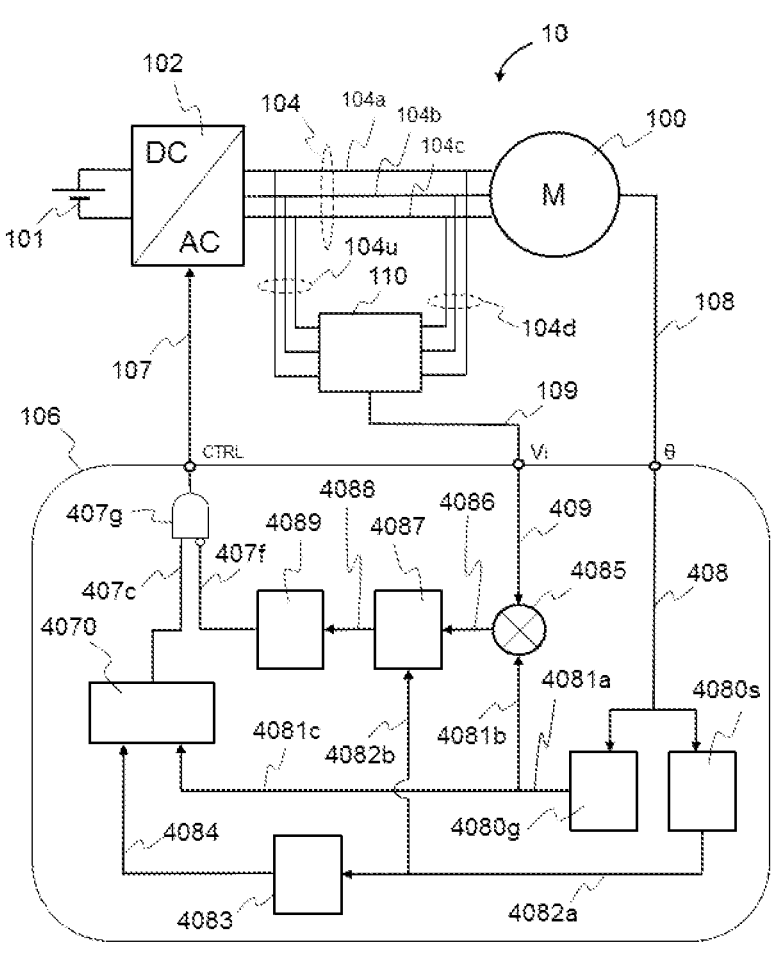
FIG. 4 schematically illustrates a controller for an electrical power supply circuit of an electric motor in an electrical power supply system of an aircraft engine, according to one embodiment, in particular comprising hardware modules and circuits.

FIG. 4 illustrates another example of an implementation of the power supply circuit controller 106. According to this embodiment, the electronic circuits internal to the controller 106 of the power supply circuit are all implemented as hardware. The synchronization signal 108 supplied by the synchronization output of the electric motor 100 is applied to a module 4080s for determining the frequency of rotation of the motor, also called a module 4080s for determining the frequency, via the input θ and via an internal connection link 408 connected to the connection link 108. The synchronization signal 408 is also applied to a module 4080g generating controlled sinusoidal signals. Sinusoidal signals can then be generated in a manner synchronized with the angular position θ of the rotor of the electric motor 100. Cleverly, a synchronized sinusoidal signal 4081a is applied via a connection link 4081b, to an input of a multiplier circuit 4085, the other input of which is connected to the signal 409 that is connected to the external connection link 109 via the input Vi, and is representative of the potential difference present between ends of the superconducting power supply link 104a, or alternatively, by multiplexing, of the power supply line 104b or of the power supply line 104c. Here again, the multiplication of a sinusoidal signal synchronized with the resistive component of the voltage across the terminals of the power supply link, and of a quantity proportional to a potential difference measured between the ends of the superconducting power supply line 104a, makes it possible to have, on an output 4086 of the multiplier 4085, information that is representative of the absence or presence of a quench phenomenon in the superconducting link 104. This information, which is in the form of a signal containing a DC component of interest and a component having a frequency of twice the frequency of the quantities of the power supply link 104, is then filtered by a low-pass filter circuit 4087 with a controlled cut-off frequency to obtain another item of information, which is even more reliable since it is devoid of high-frequency disturbances, that is representative of the absence or presence of a quench phenomenon in the superconducting power supply link 104. The low-pass filter circuit 4087 comprises a cut-off frequency control input 4082b, which input 4082b is connected to an output 4082a of the frequency determination module 4080s. It is thus advantageously possible to perform an adjusted "low-pass"-type filtering, the cut-off frequency of which depends on the frequency of rotation of the rotor of the electric motor 100. Disruptions to measurements inherent to the fact that the inductive component of the quantities present is generally much greater than the resistive component of these same quantities are therefore avoided. The signal filtered by the low-pass filter circuit 4087 available at the output of the latter is then applied, via a connection link 4088, to a command circuit 4089 configured to inhibit the output CTRL for controlling the current of the inverter 102 in the event of a problem such as, for example, a quench phenomenon. The command circuit 4089 is configured to detect a quench phenomenon, as described above, and can also be configured to detect a temperature problem or else a current problem, for example. More broadly, the command circuit 4089 is configured to perform supervision and protection functions for the superconducting electrical power supply circuit. In fact, a signal available at the output 407f of the command circuit 4089 is applied to a command output (or controlled output) configured to validate or inhibit the transmission of a command signal 407c that is able to be transmitted to the output pin CTRL of the power supply circuit controller 106 via a controlled output circuit 407g. Thus, the command signal 407c that is able to be transmitted to the output pin CTRL is determined by way of example by vector control. The signal 107 is therefore identical to the signal 407c when the controlled output circuit 407g is not activated by the command circuit 4089 to inhibit the current control of the inverter 102. A circuit 4070 for controlling the motor torque determines a command signal CTRL from a signal 4084 that corresponds to the torque setpoint and the signal 4081c that is representative of the angular position of the electric motor 100. The signal 4084 that is representative of the torque setpoint is supplied by a speed regulation circuit 4083 which operates on the basis of the module 4080s for determining the frequency of rotation of the electric motor 100.

Figure 6:
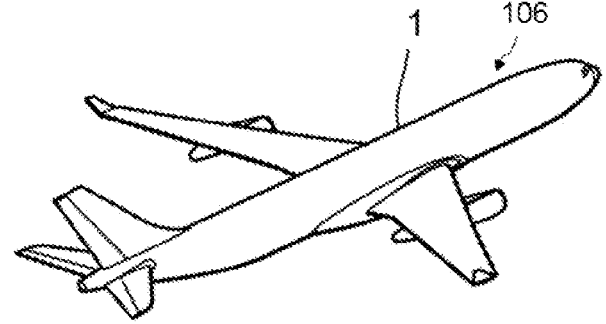

FIG. 6 illustrates an aircraft 1 comprising the electrical power supply system 10 described above, which system comprises the controller 106. The use of such a system on board an aircraft propelled with the aid of at least one electric motor such as the electric motor 100 makes it possible to offer an increased level of safety in the event of the occurrence of a quench phenomenon on an electrical power supply link of a motor.

The clever use of a measurement of the position θ of the rotor of the electric motor advantageously makes it possible to dispense with the use of a PLL (phase-locked loop) circuit to distinguish between the resistive component and the inductive component of the electrical quantities present. In fact, the use of a PLL circuit is complex and sensitive in a noisy environment such as an electrical power supply link of an electric motor.

In addition, the clever use of a low-pass filter circuit with a cut-off frequency controlled as a function of the frequency of rotation of the motor makes it possible to obtain a compromise between the bandwidth of the signals for which protection is implemented and the rejection of higher-frequency parasitic signals, in particular the component at a frequency twice the working frequency inherent to the multiplication carried out by the multiplier module or circuit.

Finally, an implementation according to the embodiments described advantageously makes it possible to substantially increase the level of safety while being simple and using a very limited addition of hardware resources.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling a power supply circuit of an electric motor, the power supply circuit comprising a power converter, referred to as an inverter, configured to supply at least one AC voltage from a DC voltage source and a superconducting power supply link configured to supply said electric motor with power, the superconducting power supply link connected between an output of the inverter and the electric motor, said method being executed in a power supply circuit controller comprising a control output configured to control said inverter, at least one first input configured to receive at least one first signal representative of a voltage measured across terminals of said superconducting power supply link, and a second input, referred to as a synchronization input, configured to receive at least one second signal representative of a position of a rotor of said electric motor, said method comprising:

i) multiplying said first signal and a sinusoidal signal synchronized with said second signal to obtain a third signal representative of a resistive component of said voltage measured across terminals of said superconducting power supply link, and then, ii) when said third signal exceeds a predetermined threshold value, inhibiting said control output, and when not, repeating steps i) and ii).

2. The method according to claim 1, wherein obtaining said third signal comprises filtering with a low-pass filtering a result of a multiplication of said first signal with said second signal.

3. A controller for a power supply circuit of an electric motor, said power supply circuit comprising a power converter, referred to as an inverter, configured to supply at least one AC voltage from a DC voltage source and a superconducting power supply link configured to supply said electric motor with power, the superconducting power supply link being connected between an output of the inverter and the electric motor, said controller device for a power supply circuit comprising a control output configured to control said inverter, at least one first input configured to receive at least one first signal representative of a voltage measured across terminals of said superconducting power supply link, and a second input, referred to as a synchronization input, configured to receive at least one second signal representative of a position of a rotor of said electric motor, said controller device for a power supply circuit comprising electronic circuitry configured to:

i) multiply said first signal and a sinusoidal signal synchronized with said second signal to obtain a third signal representative of a resistive component of said voltage measured across terminals of said superconducting power supply link, and then, ii) when said third signal exceeds a threshold value, inhibit said control output, and when not, repeat steps i) and ii).

4. The controller according to claim 3, further comprising:

a circuit for low-pass filtering a result of a multiplication of said first signal with said second signal to obtain said third signal.

5. The controller according to claim 3, wherein said electronic circuitry comprises a control unit with a microprocessor.

6. The controller according to claim 3, further comprising:

a signal multiplier circuit comprising an output and two inputs, a first of said two inputs connected to said first input and the second of said two inputs connected to an output of a controlled sinusoidal signal generator, a low-pass filter circuit with a controlled cut-off frequency, comprising a filtered signal output and an input for a signal to be filtered connected to said output of said signal multiplier, and a cut-off frequency control input connected to an output of a frequency determination module, a command circuit comprising an input connected to said output of said low-pass filter circuit, and a command output configured to validate or inhibit a transmission of a command signal transmitted to said control output.

7. The controller according to claim 6, wherein said frequency determination module is configured to determine a frequency of rotation of said electric motor from an electrical signal, comprising pulses, applied to said second input, and wherein said controlled sinusoidal signal generator is configured to generate a sinusoidal signal of determined frequency synchronized with a reference position of the rotor of the electric motor.

8. The controller according to claim 7, wherein said controlled cut-off frequency of said low-pass filter circuit is determined with said determined frequency of rotation.

9. A system for supplying electrical power to an electric motor, comprising:

the controller according to claim 3.

10. An aircraft comprising:

the controller according to claim 3.

11. A non-transitory computer readable storage medium storing a computer program comprising instructions for executing the method according to claim 1, when said program is executed by a processor of a power supply circuit controller.

*     *     *     *     *